United States Patent
Lu

(10) Patent No.: US 9,286,005 B2
(45) Date of Patent: Mar. 15, 2016

(54) AUDIO TRANSCEIVER

(71) Applicants: LITE-ON ELECTRONICS (GUANGZHOU) LIMITED, Guangzhou (CN); LITE-ON TECHNOLOGY CORP., Taipei (TW)

(72) Inventor: Chen-Yu Lu, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/601,411

(22) Filed: Jan. 21, 2015

(65) Prior Publication Data

US 2016/0019021 A1    Jan. 21, 2016

(30) Foreign Application Priority Data

Jul. 18, 2014   (CN) .......................... 2014 1 0345018

(51) Int. Cl.
```
G06F 17/00    (2006.01)
G06F 3/06     (2006.01)
G06F 3/16     (2006.01)
H04W 4/00     (2009.01)
H04M 1/725    (2006.01)
```
(52) U.S. Cl.
CPC .............. G06F 3/0664 (2013.01); G06F 3/165 (2013.01); H04M 1/7253 (2013.01); H04W 4/008 (2013.01); G06F 2212/2146 (2013.01); G06F 2213/0042 (2013.01)

(58) Field of Classification Search
CPC . H04M 1/6091; H04M 1/7253; H04W 84/18; H04L 1/0014; H04L 5/1438; H04L 5/607; G06F 2212/2146; G06F 2213/0042; G06F 3/1209; G06F 3/0664
See application file for complete search history.

(56) References Cited

U.S. PATENT DOCUMENTS

| | | | | |
|---|---|---|---|---|
| 2007/0264983 A1* | 11/2007 | Chen | ...................... | G06F 3/038 455/414.1 |
| 2008/0081667 A1* | 4/2008 | Parikh | ................... | H04W 8/005 455/558 |
| 2008/0165895 A1* | 7/2008 | Lesser | ................. | H04L 65/1059 375/316 |
| 2013/0324099 A1* | 12/2013 | Dgani | ..................... | C08L 97/02 455/418 |
| 2015/0149144 A1* | 5/2015 | Davis | .................. | G06F 17/5009 703/20 |
| 2015/0347016 A1* | 12/2015 | Shacham | ................ | G06F 3/061 711/103 |

* cited by examiner

Primary Examiner — Andrew C Flanders
(74) Attorney, Agent, or Firm — Rosenberg, Klein & Lee

(57) ABSTRACT

An audio transceiver capable of wirelessly receiving source audio data from a multimedia device, and to be coupled to an audio playback device via a USB interface includes a processing unit that makes the audio transceiver appear as a virtual USB storage device to the audio playback device, and that establishes a virtual audio file to be read by the audio playback device. Upon receipt of a file segment request from the audio playback device via the USB interface, the processing unit generates an audio file segment data associated with the source audio data to have a format supported by the audio playback device and transmits the same to the audio playback device as playable audio data via the USB interface.

4 Claims, 1 Drawing Sheet

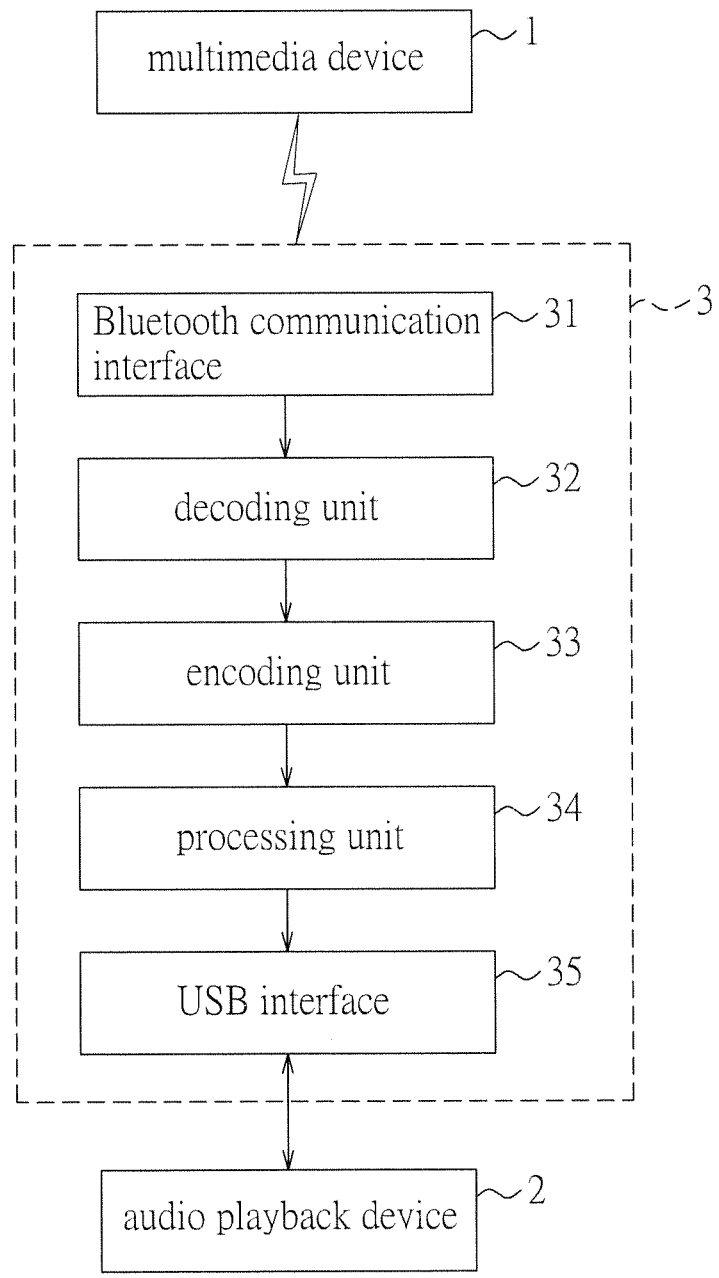

AUDIO TRANSCEIVER

CROSS-REFERENCE TO RELATED APPLICATION

This application claims priority of Chinese Patent Application No. 201410345018.5, filed on Jul. 18, 2014.

FIELD OF INVENTION

The invention relates to an audio transceiver, more particularly to an audio transceiver with Bluetooth wireless communication capability.

BACKGROUND OF THE INVENTION

Handheld multimedia devices (such as smart phones, MP3MP4 players, etc.) have become popular due to their large storage space and ability to support wireless audio transmission. However, most vehicle or home stereos currently in use do not support wireless communication.

Either a wired connection or use of FM broadcasting is required for receiving audio from the handheld multimedia devices. However, the former imposes a distance restriction that affects the convenience of operating the handheld multimedia devices, while the latter requires frequent switching of channels to avoid interference, in addition to the use of a wired headset to act as an antenna.

Although wireless audio receivers that can be connected to audio jacks exist on the market, they run on an additional battery source whose size affects the volume and battery life of the receivers. In addition, the analog-to-digital conversion between audio jacks and stereo hosts degrades sound quality.

SUMMARY OF THE INVENTION

Therefore, the object of the present invention is to provide an audio transceiver that can provide enhanced operation convenience when used with those existing stereos which do not support wireless communication.

According to the present invention, there is provided an audio transceiver adapted for providing playable audio data to an audio playback device. The playable audio data is associated with source audio data received wirelessly by the audio transceiver from a multimedia device. The audio transceiver includes a Bluetooth communication interface, a USB interface, a decoding unit, an encoding unit and a processing unit.

The Bluetooth communication interface is capable of establishing a wireless electrical connection with the multimedia device to receive the source audio data therefrom. The USB interface is adapted to be electrically coupled to the audio playback device to receive a file segment request therefrom. The decoding unit is electrically coupled to the Bluetooth communication interface to receive the source audio data therefrom, and decodes the source audio data to generate standard audio data. The encoding unit is electrically coupled to the decoding unit to receive the standard audio data therefrom, and encodes the standard audio data to generate an audio file format data that is in a format supported by the audio playback device. The processing unit is capable of making the audio transceiver appear as a virtual USB storage device to the audio playback device, and establishes a virtual audio file to be read by the audio playback device. The processing unit is electrically coupled to the encoding unit and the USB interface to receive the audio file format data and the file segment request respectively therefrom, and is capable of generating an audio file segment data from the audio file format data according to the file segment request. The audio file segment data is in a format supported by the audio playback device and is transmitted to the audio playback device via the USB interface as the playable audio data.

BRIEF DESCRIPTION OF THE DRAWING

Other features and advantages of the present invention will become apparent in the following detailed description of the embodiment with reference to the accompanying drawing, of which:

The FIG. is a block diagram for illustrating an embodiment of an audio transceiver according to the present invention.

DETAILED DESCRIPTION OF THE EMBODIMENT

Referring to the FIG., an embodiment of an audio transceiver 3 according to the present invention is adapted for providing playable audio data to an audio playback device 2. The playable audio data is associated with source audio data received wirelessly by the audio transceiver 3 from a multimedia device 1. The audio playback device 2 may be an existing vehicle or home stereo, includes a USB interface (not shown) for connection with a USB storage device (not shown), and has USB file-accessing functionality, i.e., being able to read and play audio files (such as WMA, MP3 and WAV files among others) stored in the USB storage device. The multimedia device 1 maybe any device having built-in Bluetooth functionality or being able to externally connect to a Bluetooth transmitter; examples include smart phones, music/video players, notebook computers, tablet computers, desktop computers, etc.

The audio transceiver 3 includes a Bluetooth communication interface 31 capable of establishing a wireless electrical connection with the multimedia device 1, a decoding unit 32 electrically coupled to the Bluetooth communication interface 31, an encoding unit 33 electrically coupled to the decoding unit 32, a processing unit 34 electrically coupled to the encoding unit 33, and a USB interface 35 electrically coupled to the processing unit 34. The USB interface 35 is adapted to be electrically coupled to the USB interface of the audio playback device 2 so as to allow the audio transceiver 3 to be plugged to the audio playback device 2.

In this embodiment, both the multimedia device 1 and the Bluetooth communication interface 31 are compatible with Advanced Audio Distribution Profile (A2DP), so that the multimedia device 1 is capable of transmitting high-quality stereo audio data, which is the source audio data in this case, to the audio transceiver 3 via the Bluetooth communication interface 31. The source audio data may be audio data encoded using sub-band coding (SBC). Once the multimedia device 1 and the audio transceiver 3 have paired up (having established a Bluetooth connection), the source audio data encoded using SBC is transmitted to the Bluetooth communication interface 31 under A2DP.

The Bluetooth communication interface 31 transmits the source audio data received from the multimedia device 1 to the decoding unit 32. The decoding unit 32 decodes the source audio data to generate standard audio data, such as pulse-code modulation (PCM) data, and sends the standard audio data to the encoding unit 33. The encoding unit 33 encodes the pulse-code modulation (PCM) data (i.e., the standard audio data) from the decoding unit 32 to generate an audio file format data that is in one of the formats supported by the audio playback device 2. Since most existing audio playback devices 2 support formats, such as MP3, WMA or WAV, the audio file format data generated by the encoding unit 33 may be in the listed formats.

The processing unit 34 is capable of making the audio transceiver 3 appear as a virtual USB storage device to the audio playback device 2, and establishes a virtual audio file to be read by the audio playback device 2. The processing unit 34 may define the storage capacity of the virtual USB storage device, and defines the file size, fixed header, etc., of the virtual audio file. Thus, once the audio transceiver 3 is connected to the USB interface of the audio playback device 2 via the USB interface 35 thereof, the audio playback device 2 treats the audio transceiver 3 as a USB storage device that contains an audio file, which is deemed playable by the audio playback device 2.

Therefore, when the audio playback device 2 is to play audio from the audio transceiver 3 (such as when a user presses a "play" button on the audio playback device 2), since the audio playback device 2 reads and processes for playback (e.g., decoding) a segment of an audio file at a time, the audio playback device 2 will consecutively send file segment requests to the audio transceiver 3 to request for file segment data. Each file segment request is passed on to the processing unit 34 by the USB interface 35 upon receipt, and defines the number of blocks required for the requested file segment data. For example, the file segment request may define that a file segment data is to contain 125 blocks, and if one block contains 512 bytes of data, then the file segment data is to contain a total of 64K (512 bytes×125) of data.

Upon receipt of the file segment request, in the case where the processing unit 34 is receiving the audio file format data from the encoding unit 33 (this happens when the audio transceiver 3 is receiving the source audio data from the multimedia device 1 via Bluetooth technology), the processing unit 34 will generate an audio file segment data (with the number of blocks as defined in the segment request) from the audio file format data according to the file segment request. The audio file segment data is packaged in a format supported by the audio playback device 2 and is then transmitted to the audio playback device 2 via the USB interface 35 as the playable audio data. Hence, in accordance with consecutive file segment requests sent by the audio playback device 2, the processing unit 34 will continuously generate and transmit the corresponding audio file segment data to the audio playback device 2. This way, without altering the functionality of a currently-existing audio playback device 2 audio corresponding to the source audio data from the multimedia device 1 may be played by the audio playback device 2 conveniently.

Upon receipt of the file segment request, in the case where the Bluetooth communication interface 31 has yet to receive any source audio data (e.g., when the multimedia device 1 has not output any data; when a "pause" button on the multimedia device 1 has been pressed; or when the multimedia device 1 is a smart phone and has an incoming call), the encoding unit 33 outputs muted audio file format data to the processing unit 34, which then transmits the muted audio file format data to the audio playback device 2 via the USB interface 35 to prevent the audio playback device 2 from halting its audio playback.

Furthermore, when the Bluetooth communication interface 31 receives the source audio data from the multimedia device 1, but the file segment request has yet been received through the USB interface 35 (either the audio playback device 2 has not started playing, or the "pause" button is pressed), the processing unit 34 discards the audio file format data received from the encoding unit 33. In other words, to allow synchronization between the audio playback device 2 and the multimedia device 1, the processing unit 34 will continue to discard incoming audio file format data as long as no file segment request is received.

Moreover, it is worth mentioning that, the audio playback device 2 may directly supply electricity to the audio transceiver 3 through the USB interface 35 so that an additional battery for the audio transceiver 3 is not required, eliminating battery life problems and the use of space to accommodate the battery. This effectively reduces the size of the audio transceiver 3 to one similar to that of a USB thumb drive.

In summary, through use of the audio transceiver 3, which receives the source audio data from the multimedia device 1 via the Bluetooth communication interface 31, converts the source audio data into the audio file format data that is in a format supported by the audio playback device 2 through decoding and encoding, disguises as a USB storage device, has established therein a virtual audio file for the audio playback device 2 to read, and capable of generating audio file segment data according to the file segment requests from the audio playback device 2, the audio playback device 2 is able to playback audio with the multimedia device 1 as the source without altering any existing functionality thereof and in a manner that the audio playback device 2 ordinarily plays audio data from a USB storage device.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An audio transceiver adapted for providing playable audio data to an audio playback device, the playable audio data being associated with source audio data received wirelessly by said audio transceiver from a multimedia device, said audio transceiver comprising:
    a Bluetooth communication interface capable of establishing a wireless electrical connection with the multimedia device to receive the source audio data therefrom;
    a USB interface adapted to be electrically coupled to the audio playback device to receive a file segment request therefrom;
    a decoding unit electrically coupled to said Bluetooth communication interface to receive the source audio data therefrom, and decoding the source audio data to generate standard audio data;
    an encoding unit electrically coupled to said decoding unit to receive the standard audio data therefrom, and encoding the standard audio data to generate an audio file format data that is in a format supported by the audio playback device; and
    a processing unit capable of making said audio transceiver appear as a virtual USB storage device to the audio playback device, and establishing a virtual audio file to be read by the audio playback device, said processing unit being electrically coupled to said encoding unit and said USB interface to receive the audio file format data and the file segment request respectively therefrom, and being capable of generating an audio file segment data from the audio file format data according to the file segment request, the audio file segment data being in a format supported by the audio playback device and being transmitted to the audio playback device via said USB interface as the playable audio data.

2. The audio transceiver as claimed in claim 1, wherein said Bluetooth communication interface is compatible with Advanced Audio Distribution Profile (A2DP), and the source audio data is audio data encoded using sub-band coding (SBC), said standard audio data being pulse-code modulation (PCM) data, the encoding unit encoding the pulse-code modulation data and generating the audio file format data having a format of one of MP3, WMA and WAV.

3. The audio transceiver as claimed in claim 1, wherein when said Bluetooth communication interface has not yet received the source audio data, said encoding unit outputs muted audio file format data to said processing unit upon receipt of the file segment request from the audio playback device via said USB interface.

4. The audio transceiver as claimed in claim 1, wherein when the file segment request has not yet been received through said USB interface, said processing unit discards the audio file format data received from said encoding unit.

* * * * *